(12) United States Patent
Nagate et al.

(10) Patent No.: US 7,919,742 B2
(45) Date of Patent: Apr. 5, 2011

(54) PROJECTOR HAVING A LIGHT INTENSITY CONTROL UNIT FOR CONTROLLING LIGHT INTENSITY OF PROJECTED LIGHT AND CONTROL METHOD OF PROJECTOR

(75) Inventors: Takashi Nagate, Suwa-gun (JP); Taisuke Yamauchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 423 days.

(21) Appl. No.: 12/112,662

(22) Filed: Apr. 30, 2008

(65) Prior Publication Data
US 2008/0291405 A1    Nov. 27, 2008

(30) Foreign Application Priority Data

May 21, 2007  (JP) .................................. 2007-133804
Apr. 15, 2008 (JP) .................................. 2008-105408

(51) Int. Cl.
*G01J 1/32*    (2006.01)

(52) U.S. Cl. .................................... 250/205; 250/208.1

(58) Field of Classification Search .................. 250/205, 250/208.1, 214 R; 353/85, 94, 97; 345/36, 345/45; 362/233, 283
See application file for complete search history.

(56) References Cited

U.S. PATENT DOCUMENTS 3,477,784 A * 11/1969 Jones ............................. 353/81
7,300,160 B2 * 11/2007 Nakamura .................... 353/85

FOREIGN PATENT DOCUMENTS

| JP | 11-501419 | 2/1999 |
| JP | 2004-254145 | 9/2004 |
| WO | WO98-15127 | 4/1998 |

* cited by examiner

*Primary Examiner* — Que T Le
(74) *Attorney, Agent, or Firm* — AdvantEdge Law Group, LLC

(57) ABSTRACT

A projector includes: an operation unit which receives operation by a user; a projection unit which projects light corresponding to an image signal; and a light intensity control unit which controls light intensity of the light projected by the projection unit. The light intensity control unit controls the light intensity in the order of reception of plural operations received by the operation unit from the user.

12 Claims, 6 Drawing Sheets

PROJECTOR HAVING A LIGHT INTENSITY CONTROL UNIT FOR CONTROLLING LIGHT INTENSITY OF PROJECTED LIGHT AND CONTROL METHOD OF PROJECTOR

BACKGROUND

1. Technical Field

The present invention relates to a projector and a control method of a projector.

2. Related Art

Recently, a projection type projector which projects light emitted from a light source on a screen has been widely used. However, a problem in safety that light having high luminance emitted from the projector directly enters a user's eyes is arising. In order to overcome this safety problem, various technologies for protecting the user's eyes from direct entrance of the light emitted from the projector are proposed. According to a projector disclosed in JP-T-11-501419, for example, a sensor detects the possibility that light emitted from the projector is applied to a human. In this case, the projector lowers power of a light source or turns off the switch of the light source. On the other hand, a projector disclosed in JP-A-2004-254145 picks up an image projected on a screen during projection of the image, and compares the obtained image with an input image signal. When it is determined that the user has entered the projection area based on the result of the comparison, the projector decreases the projection light to reduce the glare.

The related-art technologies shown in JP-T-11-501419 and JP-A-2004-254145 eliminate the problem when the user enters the projection area during projection of the image, but cannot cope with the case when the user already exists in the projection area before the start of image projection. For example, when light is emitted by another person's thoughtless operation of a power source under a situation in which the user is at a position where the user directly receives the projection light on the eyes, there is a possibility that the high-luminance and dangerous projection light directly enters the user's eyes. Thus, the safety problem still remains unsolved. Moreover, the related-art technologies which detect the user existing in the projection area by using the sensor or the picked up image or by other methods require a complicated system structure of the projector. In this case, the cost of the system rises.

SUMMARY

It is an advantage of some aspects of the invention to provide a projector and a control method of a projector capable of solving at least a part of the problems described above.

A projector according to a first aspect of the invention includes: an operation unit which receives operation by a user; a projection unit which projects light corresponding to an image signal; and a light intensity control unit which controls light intensity of the light projected by the projection unit. The light intensity control unit controls the light intensity in the order of reception of plural operations received by the operation unit from the user.

According to this projector, the intensity of the light projected from the projection unit is controlled in the order of reception of the plural operations by the operation unit from the user. In this case, the light intensity of the light projected from the projection unit can be varied for each operation. Thus, the projection light having high luminance is not projected from the projection unit at the start of projection but the luminance of the projection light is so controlled as to change from low to high by gradually increasing the light intensity in the order of reception of the respective operations. Accordingly, at the time of operation for projecting light with the user positioned within the projection area, the light projection is controlled such that not high luminance light but low luminance and safe light is projected so as to cope with the problem in safety by drawing attention from the user. Moreover, the necessity of detection whether the user is located within the projection area by using a sensor or the like as required in the related art is eliminated. Thus, the problem in safety can be solved by a simple structure at a low cost of the system.

It is preferable that the light intensity control unit controls the light projected by the projection unit has first light intensity when receiving first operation from the user, and that the light intensity control unit controls the light projected by the projection unit has second light intensity which is higher than the first light intensity when receiving second operation subsequently to the first operation.

According to this structure, the light intensity control unit controls the light projected by the projection unit such that the light has first light intensity when receiving first operation from the user, and subsequently such that the light has second light intensity when receiving second operation from the user. The second light intensity is higher than the first light intensity. Thus, low-luminance and safe projection light is initially projected by the first operation, and then normal high-luminance projection light is projected by the second operation. Accordingly, at the time of projection of light by the first operation with the user located at a position for receiving the projection light on the eyes, the projection light is low-luminance and safe light for the user so as to solve the problem in safety that the user receives dangerous projection light on the eyes.

It is preferable that the first operation and the second operation are operations for commanding the projection unit to project light.

According to this structure, the operation for commanding projection is divided into two operations of the first operation and second operation. Thus, low-luminance and safe light is projected by the first operation for commanding projection, and normal high-luminance projection light as an image is projected by the second operation for commanding projection in a manner different from that of the related art which projects high-luminance light by one operation for commanding projection. Accordingly, the problem in safety that the user receives dangerous projection light on the eyes can be solved.

It is preferable that the operation unit receives the second operation after elapse of a predetermined time from the reception of the first operation.

According to this structure, the second operation is received after elapse of the predetermined time from the reception of the first operation. Thus, the problem that the user receives dangerous projection light on the eyes caused by subsequent execution of the second operation without sufficient safety check after the first operation can be avoided.

It is preferable that the predetermined time is approximately 5 seconds or longer.

According to this structure, the second operation is received after elapse of approximately 5 seconds or longer from reception of the first operation. Thus, a period for sufficient safety check by the user after the first operation can be secured.

It is preferable to further include a notifying unit which outputs notification information to be given to the user. In this case, it is preferable that the notifying unit outputs notification information containing information for drawing attention to the light projected from the projection unit when the light having the first light intensity is projected from the projection unit.

According to this structure, the notifying unit outputs notification information containing information for drawing attention to the projected light when the light having the first light intensity is projected from the projection unit. Thus, at the time of projection of low-luminance and safe projection light, information for drawing attention to the projection light can be given to the user. Accordingly, the problem in safety that the user receives dangerous projection light on the eyes can be solved.

It is preferable that the notifying unit commands the projection unit to project the light having the first light intensity and containing the notification information.

According to this structure, the information for drawing attention to the projection light can be projected and displayed such that the user can read and check the contents thus projected.

It is preferable to further include a display unit which displays information for the user. In this case, it is preferable that the notifying unit commands the display unit to display the notification information.

According to this structure, the information for drawing attention to the projection light can be displayed by the display unit provided on the projector such that the user can read and check the contents thus projected.

It is preferable that operation performed by the operation unit in the second operation differs for each reception of the second operation.

According to this structure, the user performs different operation for each execution of the second operation. Thus, the problem that the user receives dangerous projection light on the eyes caused by easy execution of the second operation according to stored operation without sufficient safety check after the first operation can be avoided.

It is preferable that at least the first light intensity of the first and second light intensities is allowed to be set at an arbitrary value by the user.

According to this structure, at least the first light intensity is allowed to be set at an arbitrary value by the user. Thus, the first light intensity of low-luminance projection light as safe light for the user can be freely established according to the use environment of the projector or other conditions.

It is preferable that the projection unit has a light source which emits light and that the light intensity control unit controls the light intensity of the light projected from the projection unit by adjusting the amount of the light emitted from the light source.

According to this structure, the light intensity of the light projected from the projection unit is controlled by adjusting the amount of the light emitted from the light source. Thus, the amount of the light emitted from the light source can be easily controlled to a desired light amount by controlling power energy to be supplied to a light source device.

It is preferable that the light emitted from the light source is laser beam.

According to this structure, the light source emits laser beam, and thus the projector can project high-quality light having high luminance and color reproductiveness. Since the light amount of the laser beam emitted from the light source is stabilized within a short period, low-luminance and safe projection light can be projected from the projector immediately after reception of the first operation.

It is preferable that a process for examining the stability of the amount of the light emitted from the light source is performed after the light having the first light intensity is projected from the projection unit.

According to this structure, the process for examining the stability of the amount of the light emitted from the light source is performed after the light having the first light intensity is projected. Thus, the projector can execute the process for examining the stability of the light amount within a predetermined period from reception of the first operation to reception of the second operation, thereby reducing waiting time for the user until the light amount is stabilized.

A control method of a projector according to a second aspect of the invention includes: an operation step which receives operation by a user; a projection step which projects light corresponding to an image signal; and a light intensity control step which controls light intensity of the light projected in the projection step. The light intensity control step controls the light intensity in the order of reception of plural operations received from the user in the operation step.

According to this control method of the projector, the light intensity control step controls the light intensity of the light projected in the projection step in the order of reception of plural operations received from the user in the operation step. In this case, the light intensity of the light projected in the projection step can be varied for each operation. Thus, the projection light having high luminance is not projected in the projection step at the start of projection but the luminance of the projection light is so controlled as to change from low to high by gradually increasing the light intensity in the order of reception of the respective operations. Accordingly, at the time of operation for projecting light with the user positioned within the projection area, the light projection is controlled such that not high luminance light but low luminance and safe light is projected so as to cope with the problem in safety by drawing attention from the user. Moreover, the necessity of detection whether the user is located within the projection area by using a sensor or the like as required in the related art is eliminated. Thus, the problem in safety can be solved by a simple structure at a low cost of the system.

BRIEF DESCRIPTION OF THE DRAWINGS

The invention will be described with reference to the accompanying drawings, wherein like reference numbers are given to like elements.

DESCRIPTION OF EXEMPLARY EMBODIMENTS

First Embodiment

A projector according to a first embodiment is now described with reference to the drawings.

General Structure of Projector

Initially, the general structure of the projector according to the first embodiment is explained.

Figure 1:
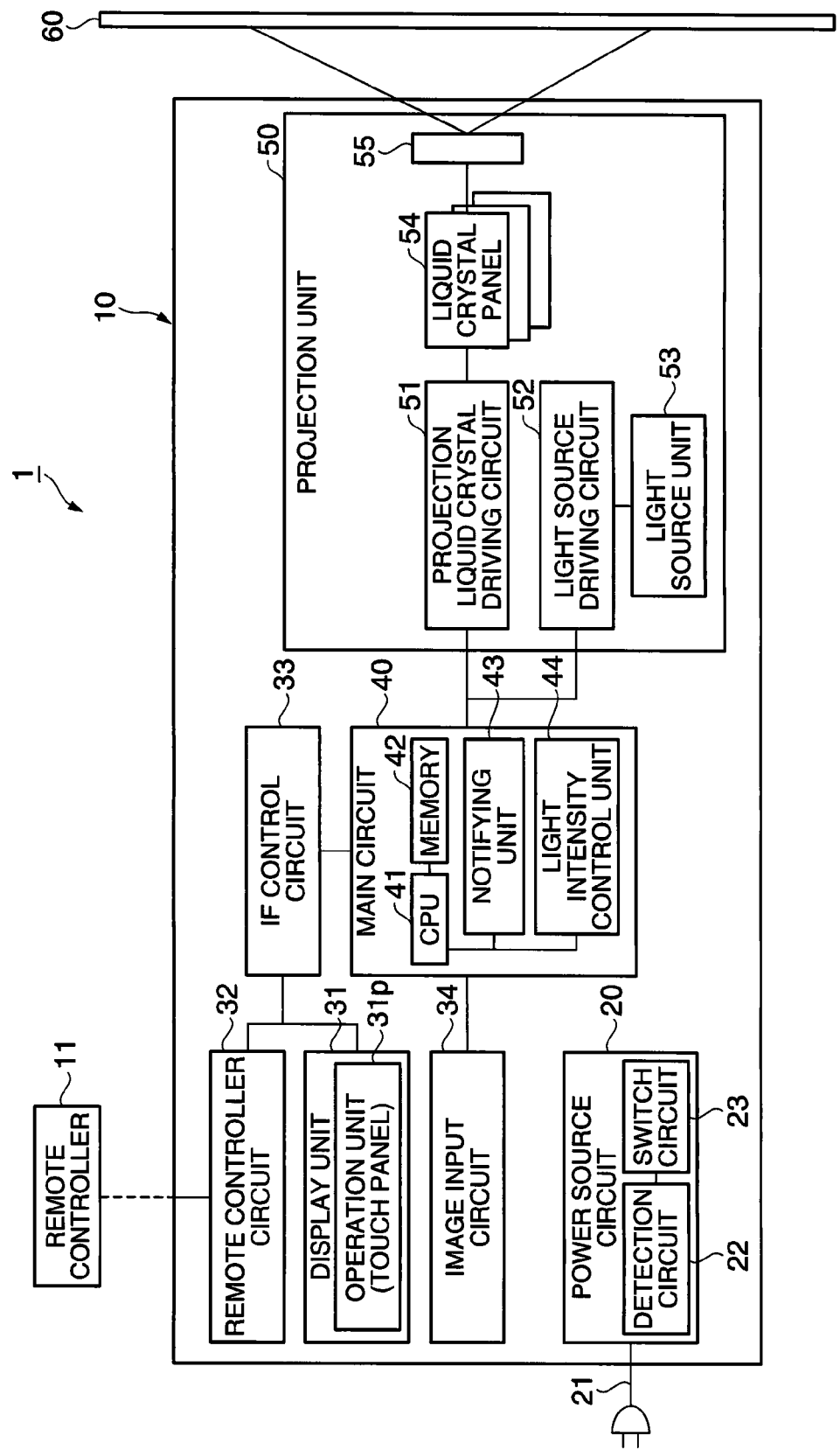
FIG. 1 is a block diagram showing a general structure of a projector according to a first embodiment.

FIG. 1 is a block diagram showing the general structure of the projector according to the first embodiment. As illustrated in the figure, a projector 1 includes a projector main body 10 and a remote controller 11. The projector main body 10 contains a power source circuit 20, a display unit 31, a remote controller circuit 32, an IF (abbreviation of interface) control circuit 33, an image input circuit 34, a main circuit 40, and a projection unit 50 having a projection liquid crystal driving circuit 51, a light source driving circuit 52, a light source unit 53, liquid crystal panels 54 for respective color lights, and a projection lens 55.

The power source circuit 20 has a detection circuit 22 and a switch circuit 23. The power source circuit 20 has a power source terminal to which a power source cable 21 is connected. The projector main body 10 is connected with external power via the power source cable 21 by inserting a power source plug provided at one end of the power source cable 21 into an outlet, for example. When connection between the projector main body 10 and the external power is made, the detection circuit 22 detects the connection with the power source and outputs a detection signal to the switch circuit 23. Then, the switch circuit 23 is closed to supply power to the projector main body 10.

A touch panel 31p as an operation unit is provided on the display unit 31. When the user operates the touch panel 31p (pushes a particular portion), the touch panel 31p outputs an operation signal corresponding to the operated position to the IF control circuit 33.

The remote controller 11 is operated to perform remote control over the operation of the projector main body 10. When the user operates the remote controller 11, the remote controller 11 transmits an operation signal to the projector main body 10. The remote controller circuit 32 of the projector main body 10 receives the operation signal from the remote controller 11, and outputs the operation signal to the IF control circuit 33.

The IF control circuit 33 outputs the operation signals received from the touch panel 31p and the remote controller 32 to the main circuit 40. The IF control circuit 33 performs controls such as outputting a display image corresponding to a signal received from the main circuit 40 to the display unit 31, and controlling the operation of the remote controller circuit 32.

The image input circuit 34 is connected with a personal computer, a DVD (digital versatile disc) reproduction device, or other device such that image signals can be inputted therefrom to the image input circuit 34. The image input circuit 34 outputs the received image signal to the main circuit 40.

The main circuit 40 has a CPU 41 for processing images and signals, a memory 42 containing a ROM (read only memory) for storing programs, a notifying unit 43, a light intensity control unit 44, and other sections. The main circuit 40 controls operations of the IF control circuit 33, the image input circuit 34, the projection liquid crystal driving circuit 51, the light source driving circuits 52, and other sections according to the received signal. The main circuit 40 outputs the image signal received from the image input circuit 34 to the projection liquid crystal driving circuit 51. The notifying unit 43 commands the display unit 31 to display a message as notification information to be given to the user via the IF control circuit 33, and to project the message on a screen 60 via the projection unit 50. The light intensity control unit 44 controls the intensity of light projected from the projection unit 50.

In response to the image signal received from the main circuit 40, the projection liquid crystal driving circuit 51 outputs driving signals for respective color lights to the liquid crystal panels 54 for respective color lights to actuate the liquid crystal panels 54. Respective color lights controlled by the liquid crystal panels 54 are combined by a dichroic prism (not shown), and then enlarged by a projection lens 55 and projected on the screen 60.

The light source driving circuit 52, which is a power source circuit for supplying driving power to the light source unit 53, transforms the voltage of the power supplied from the power source circuit 20 and supplies the power having transformed voltage to the light source unit 53. The light source unit 53 is a laser beam source for emitting laser beam by using semiconductor laser, solid laser, or the like, as a light source.

The light intensity control unit 44 adjusts the amount of the laser beam emitted from the light source unit 53 by controlling the power supplied from the light source driving circuit 52 to the light source unit 53. Thus, control over the intensity of light projected from the projection unit 50 is allowed.

Operation of Projector

The operation of the projector 1 according to the first embodiment is now described.

Figure 2:
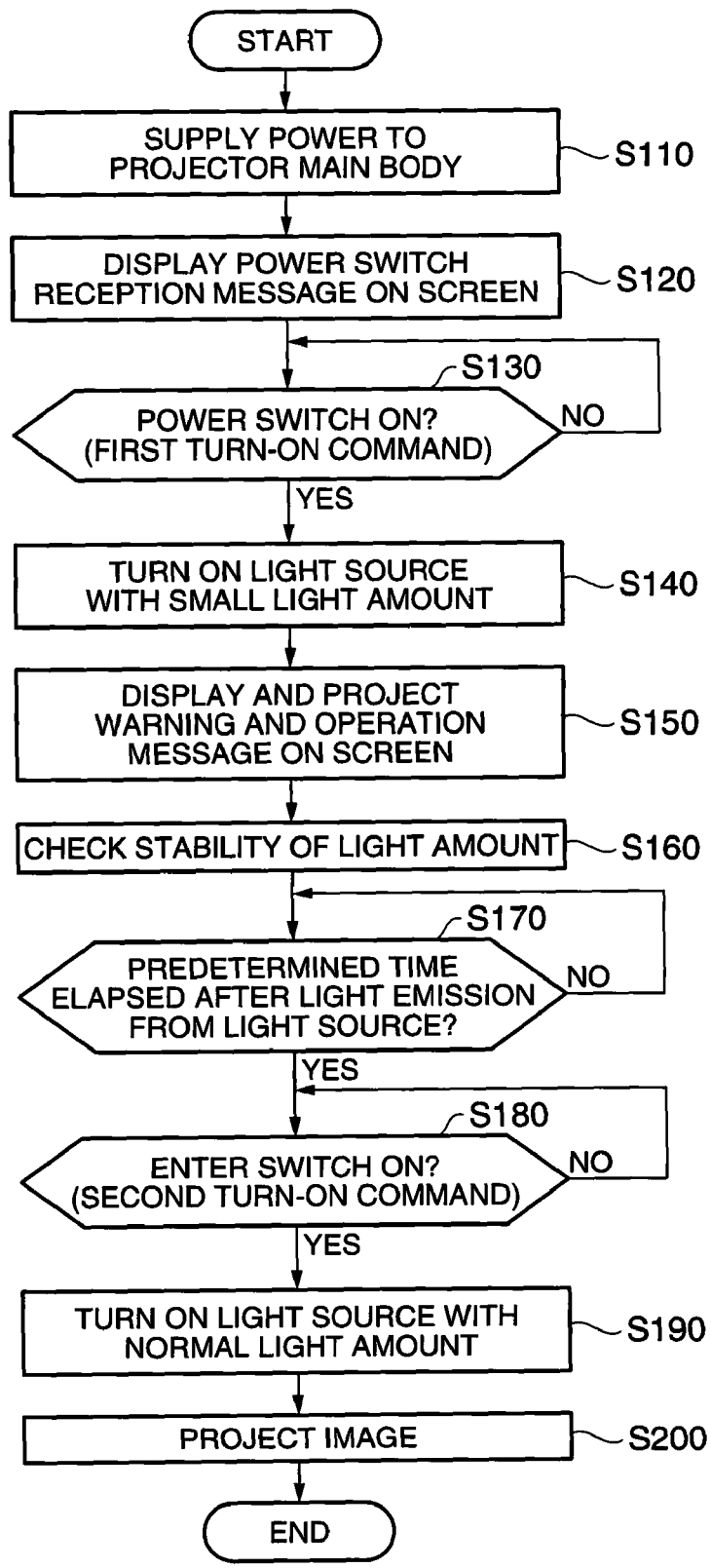
FIG. 2 is a flowchart showing operation of the projector according to the first embodiment.

FIG. 2 is a flowchart showing the operation of the projector in the first embodiment. The flow chart in this figure shows processes from the time when the projector main body 10 is connected with the external power via the power source cable 21 until the time when an image is projected on the screen 60.

When the projector main body 10 is connected with the external power source in the initial step S110, the power source circuit 20 detects connection with the power source by the detection circuit 22. Then, the power source circuit 20 closes the circuit by the switch circuit 23 to supply power to the projector main body 10.

Figure 3:
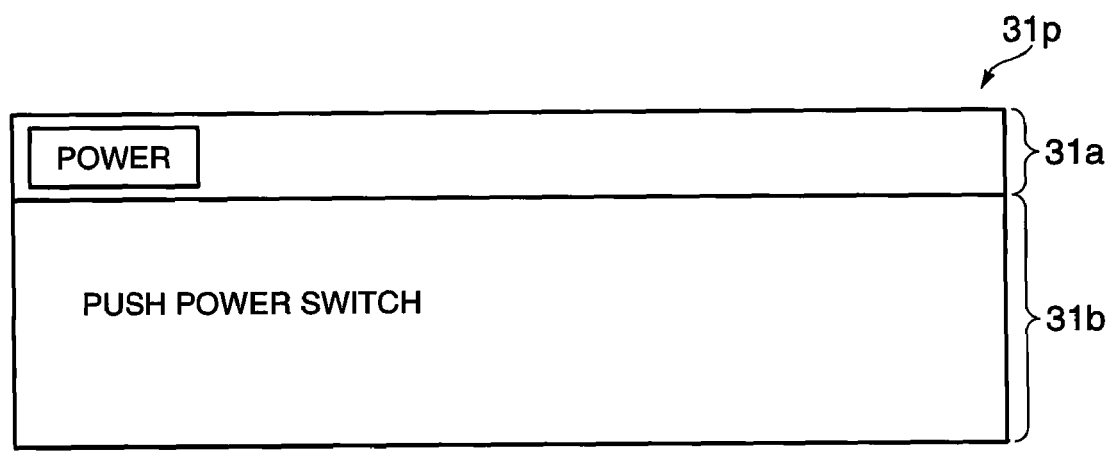
FIG. 3 illustrates a display example of a screen of a touch panel.

In step S120, the main circuit 40 commands the notifying unit 43 to display operation message for receiving Power switch ON operation as illustrated in FIG. 3, for example, on the screen of the touch panel 31p of the display unit 31. Thus, the notifying unit 43 of the main circuit 40 outputs an signal for displaying the operation message to the IF control circuit 33. The IF control circuit 33 displays the operation message on the screen of the touch panel 31p in response to the signal.

As illustrated in FIG. 3, the screen of the touch panel 31p has a system display section 31a and a message display section 31b. The system display section 31a displays switches to be operated by the user. The message display section 31b displays messages or the like to be given to the user.

In step S130, the main circuit 40 judges whether the Power switch ON operation as a first operation has been performed or not through the screen of the touch panel 31p. The Power switch ON operation is executed by the push of the user at the position of "Power" displayed on the screen of the touch panel 31p shown in FIG. 3. When it is determined that the Power switch ON operation has been performed, the process goes to the subsequent step S140. When it is determined, on the other hand, that the Power switch ON operation is not executed, the process stands by until execution of the Power switch ON operation.

In step S140, the main circuit 40 adjusts the light amount of laser beam emitted from the light source unit 53 such that the light amount becomes smaller than the normal light amount under the control of the light intensity control unit 44, and turns on the light source unit 53. In this step, the light intensity control unit 44 controls the light amount of the laser beam such that the light projected by the projection unit 50 has such a light intensity level (first light intensity) at which the light can be directly applied to the user's eyes without danger.

Figure 4A:
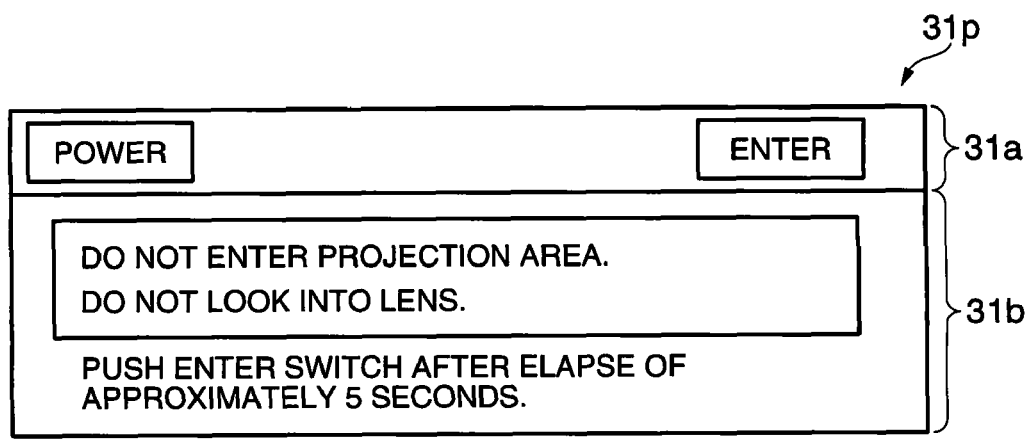
FIGS. 4A and 4B are display examples of the screen of the touch panel and a screen, respectively.

In step S150, the main circuit 40 commands the notifying unit 43 to display warning for prohibiting entrance into the projection area and operation message for receiving Enter switch ON operation as shown in FIG. 4A, for example, on the screen of the touch panel 31p. The main circuit 40 also commands the projection unit 50 to project warning and operation message shown in FIG. 4B, for example, on the screen 60 as well as the display of the warning and operation message shown in FIG. 4A on the screen of the touch panel 31p. Thus, the notifying unit 43 of the main circuit 40 outputs a signal for displaying the warning and operation message on the screen of the touch panel 31p to the IF control circuit 33. The IF control circuit 33 displays the warning and operation message on the screen of the touch panel 31p in response to the signal. The IF control circuit 33 also outputs a signal for projecting the warning and operation message on the screen 60 to the projection liquid crystal driving circuit 51. The projection liquid driving circuit 51 projects the warning and operation message on the screen 60 in response to the signal. The warnings displayed and projected on the screen of the touch panel 31p and the screen 60 are given as information for drawing attention to the light projected from the projection unit 50.

In step S160, the main circuit 40 examines the stability of the amount of the light emitted from the light source unit 53 under the control of the projection liquid crystal driving circuit 51. This examination is performed by judging whether the laser beam is emitted from the light source unit 53 in the normal condition without leakage from the optical path or other problems.

In step S170, the main circuit 40 judges whether a predetermined time has elapsed from the start of light emission from the light source unit 53 in step S140. When it is determined that the predetermined time has elapsed, the process goes to the subsequent step S180. When it is determined that the predetermined time has not elapsed yet, the process stands by until elapse of the predetermined time. In this embodiment, the predetermined time is set at approximately 5 seconds or longer.

In step S180, the main circuit 40 judges whether the Enter switch ON operation as a second operation has been performed or not through the screen of the touch panel 31p. The Enter switch ON operation is executed by the push of the user at the position "Enter" displayed on the screen shown in FIG. 4A. When it is determined that the Enter switch ON operation has been performed, the process goes to the subsequent step S190. When it is determined that the Enter switch ON operation is not executed, the process stands by until execution of the Enter switch ON operation. When it is judged that the Power switch ON operation has been performed in this step through the screen shown in FIG. 4A, the light source 53 is turned off.

In step S190, the main circuit 40 adjusts the laser beam emitted from the light source unit 53 such that the amount of the laser beam becomes the normal light amount increased from the small amount set in the previous step under the control of the light intensity control unit 44, and turns on the light source 53. Thus, the intensity of the light projected from the projection unit 50 becomes the normal intensity level (second light intensity) from the light intensity level at which light can be applied to the eyes without danger (first light intensity).

In step S200, the main circuit 40 commands the projection unit 50 to project an image corresponding to the image signal inputted to the image input circuit 34 on the screen 60.

According to an aspect of the invention, an operation step corresponds to step S130 and S180. Similarly, a projection step corresponds to step S200, and a light intensity control step corresponds to the process for controlling the light amount of the laser beam emitted from the light source unit 53 in steps S140 and S190.

Advantage

As discussed above, the projector according to this embodiment receives the Power switch ON operation through the screen of the touch panel 31p after connection between the projector main body 10 and the external power is made. When the Power switch ON operation is performed, the projector controls the projection unit 50 during projection of light at such a light intensity level as to be applicable to the user's eyes without danger, and turns on the light source unit 53. Then, the projector displays the warning for prohibiting entrance into the projection area and the operation message on the screen of the touch panel 31p, and projects the warning and operation message on the screen 60 via the projection unit 50. That is, in response to the Power switch ON operation as the initial operation after connection with the external power, the projector projects not light which has high luminance providing the normal light intensity, but light which has low luminance at the light intensity level safe for the user.

Thus, when the user located at such a position as to receive the projection light on the eyes receives the projection light on the eyes through execution of the Power switch ON operation, the light entering the user's eyes is not dangerous high-luminance light but safe low-luminance light. Also, the warning for prohibiting entrance into the projection area is displayed on the screen of the touch panel 31p and projected on the screen 60 to draw the user's attention to the projection light. Accordingly, the problem in safety that dangerous projection light enters the user's eyes is avoided.

The Enter switch ON operation is received through the screen of the touch panel 31p after elapse of the predetermined time from the initial light emission from the light source unit 53. When it is judged that the Enter switch ON operation has been performed, the projector controls such that light at the normal light intensity level is projected from the projection unit 50 and turns on the light source unit 53. Then, an image corresponding to the inputted image signal is projected on the screen 60 via the projection unit 50. Thus, low-luminance light safe for the user is projected by the initial operation, and then an image having the normal high-luminance is projected on the screen 60 by the second operation after elapse of the predetermined period.

By this step, the possibility that the user receives dangerous projection light on the eyes caused by executing the second operation without sufficient safety check subsequently after the initial operation is eliminated. Since the process for examining the stability of the amount of the light emitted from the light source unit 53 is carried out during the period from the initial light emission from the light source unit 53 to the elapse of the predetermined time, the waiting time for the user for stabilizing the light amount is reduced. In this embodiment, the predetermined time is set at approximately five seconds or longer which is sufficient for complete safety check by the user after reading the warning. The process for examining the stability of the light amount is completed within this period.

Second Embodiment

A projector according to a second embodiment is now described with reference to the drawings.

The general structure of the projector in the second embodiment is similar to that of the general structure of the projector in the first embodiment shown in FIG. 1. The operation of the projector in the second embodiment is similar to the operation shown in the flowchart in FIG. 2 according to the first embodiment, but the process for screen-displaying and projecting the warning and operation message in step S150 and the process for receiving the Enter switch in step S180 are different.

Figure 5A:
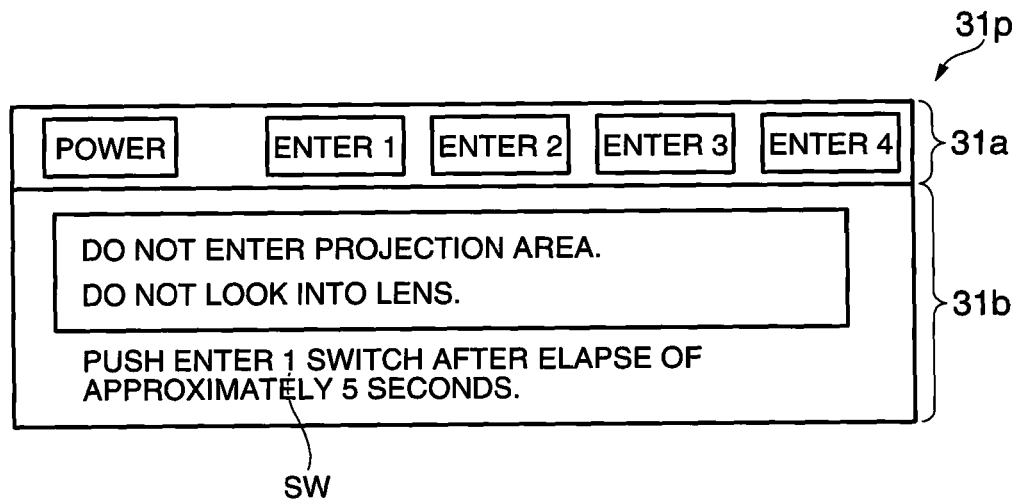
FIGS. 5A and 5B are display examples of a screen of a touch panel and a screen, respectively, according to a second embodiment.
Figure 5B:
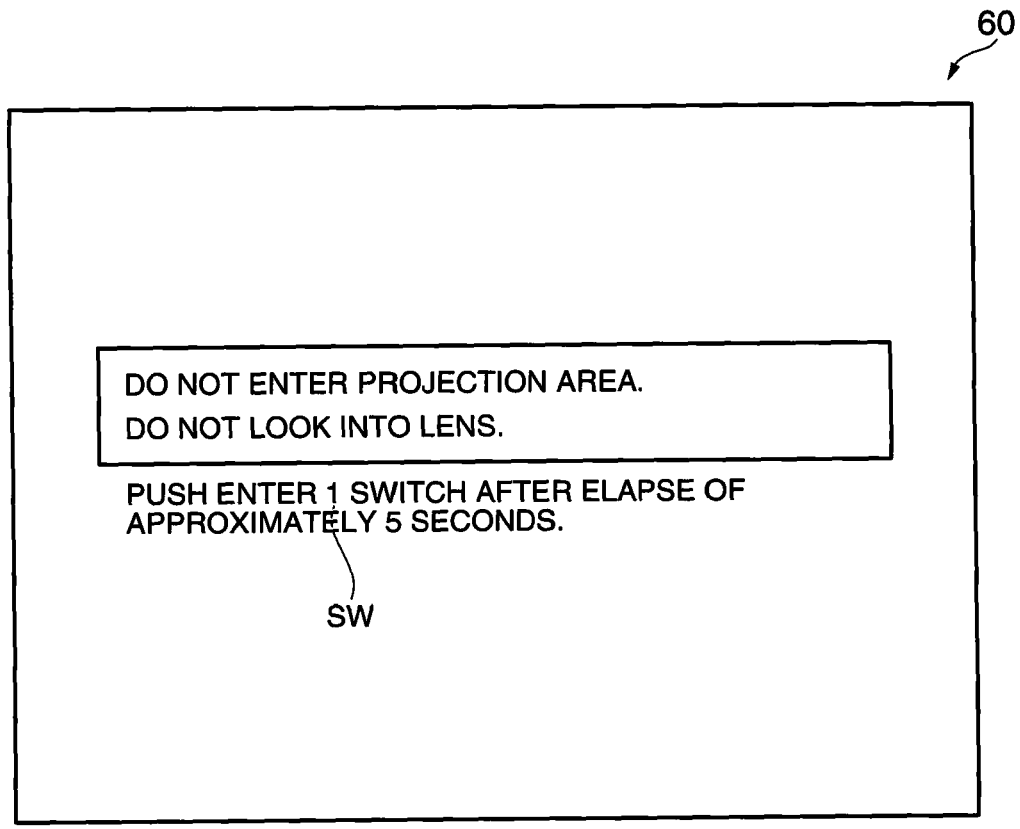

In step S150 in the second embodiment which is different from that in the first embodiment, warning and operation message shown in FIG. 5A are displayed on the screen of the touch panel 31p, for example, and warning and operation message shown in FIG. 5B are projected on the screen 60 via the projection unit 50, for example. As illustrated in FIG. 5A, the "Power" switch, and the four Enter switches "Enter 1" through "Enter 4" are displayed on the system display section 31a of the screen of the touch panel 31p. As illustrated in FIGS. 5A and 5B, the message for receiving the "Enter 1" switch is displayed and projected at operation message SW positions of the message display section 31b on the screen of the touch panel 31p and the screen 60.

Figure 6A:
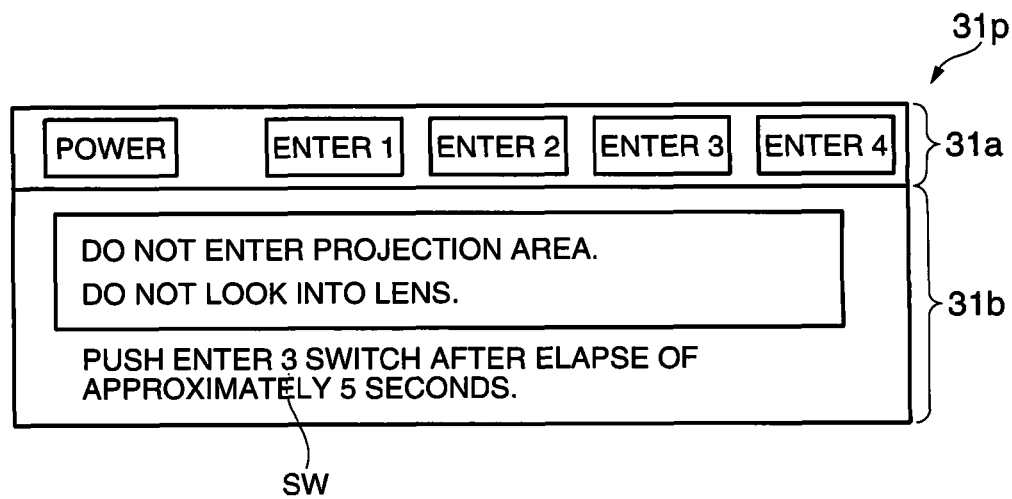
FIGS. 6A and 6B are display examples of the screen of the touch panel and the screen, respectively, according to the second embodiment.
Figure 6B:
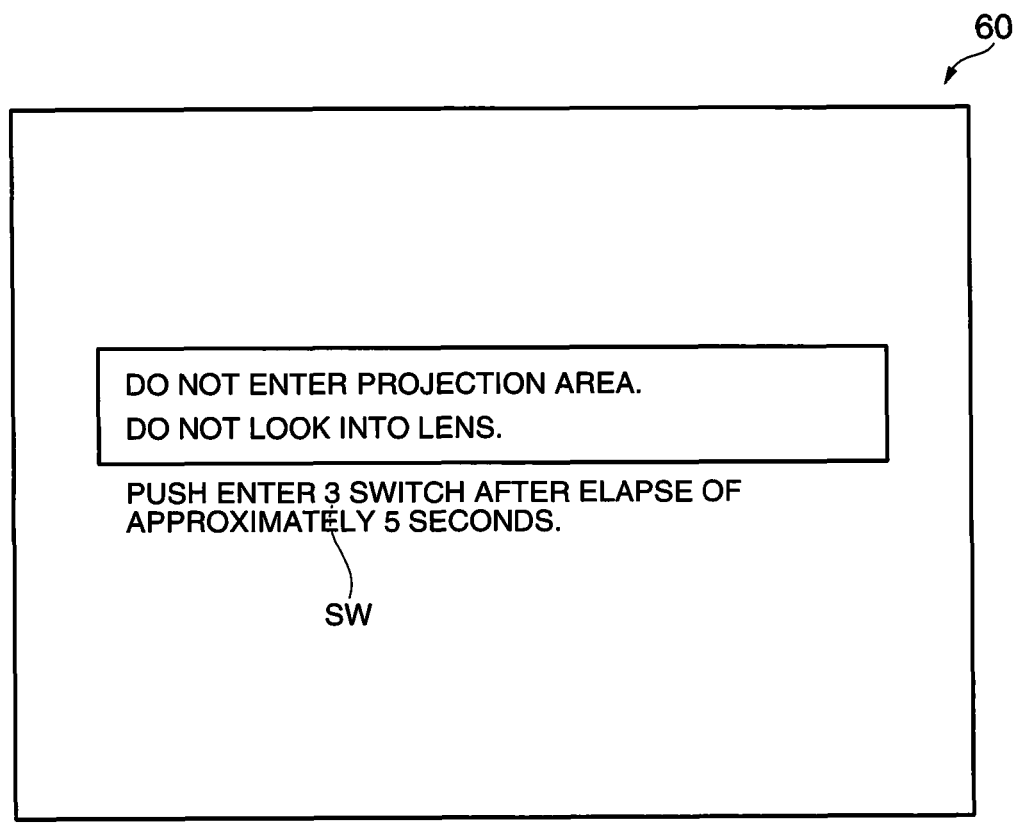

In step S150, the contents of the operation message displayed and projected on the message display unit 31b and the screen 60 differ each time the process in step S150 is performed. That is, the contents of the warning and operation message differ every time they are displayed and projected on the screen of the touch panel 31p and the screen 60. More specifically, the type of the Enter switch contained in each operation message differs. For example, the message for receiving "Enter 3" switch is displayed and projected at the operation message SW positions shown in FIGS. 6A and 6B. The types of the Enter switches may be displayed and projected in any order. For example, they may be displayed and projected in the order of "Enter 1", "Enter 2", "Enter 3", and "Enter 4", or in an arbitrary order of "Enter 1", "Enter 4", "Enter 2", and "Enter 3".

In step S180 in the second embodiment, the main circuit 40 judges whether the Enter switch ON operation has been performed to select the type of the Enter switch displayed in the operation message in step S150 on the screen of the touch panel 31p. The type of the Enter switch to be received differs every time the process in step S180 is performed. According to the example of the screen of the touch panel 31p shown in FIG. 5A, it is judged whether the "Enter 1" switch has been pushed. According to the example of the screen of the touch panel 31p shown in FIG. 6A, it is judged whether the "Enter 3" switch has been pushed.

Advantage

According to the projector in this embodiment described above, the type of the Enter switch contained in the operation message to be displayed and projected on the screen of the touch panel 31p and the screen 60 differs every time the Enter switch is displayed and projected. When the displayed and projected Enter switch on the screen of the touch panel 31p is pushed, an image having the normal high-luminance is projected on the screen 60. The user is required to check the contents of the operation message for each time so that the image having the normal high-luminance can be projected on the screen 60. By this method, the possibility that dangerous projection light is applied to the user's eyes caused by the push of the Enter switch without sufficient safety check by the user after display and projection of the warning and operation message on the screen of the touch panel 31p and the screen 60 can be eliminated.

Modification 1

According to the above embodiments, the Power switch ON operation is received through the screen of the touch panel 31p after connection between the projector main body 10 and the external power is made. Not limited to this, it is possible, however, to turn off the light source unit 53 when the Power switch ON operation is performed by the user with an image projected on the screen 60. In this case, the Power switch ON operation is again received through the screen of the touch panel 31p. Alternatively, other operation such as reception of pass word input may be inserted before reception of the Power switch ON operation through the screen of the touch panel 31p.

Modification 2

In the embodiments described above, the operation of the user is received through the screen of the touch panel 31p where the warning and operation message are displayed. However, not limited to the touch panel 31p, the operation of the user may be received by operating operation buttons provided on a display panel equipped on the projector main body 10 for displaying the warning and operation message. Alternatively, the warning and operation message may be displayed on the remote controller, or operation by the user may be received from the remote controller. While the Power switch ON operation and the Enter switch ON operation have been received in the above embodiments, other arbitrary types of switches may be used.

Modification 3

According to the above embodiments, the warning and operation message are displayed and projected on the screen of the touch panel 31p and the screen 60. In this case, blinking projection light may be applied to the screen 60 so as to draw more attention, for example. Alternatively, buzzer sounds, voices or the like may be given at the time of display and projection of the warning and operation message for attracting more caution.

Modification 4

According to the above embodiments, the amount of the laser beam emitted from the light source unit 53 is adjusted to control the intensity of the light projected from the projection unit 50 by controlling power supplied to the light source unit 53. However, the light intensity may be adjusted by providing a filter, diaphragm or the like on the optical path between the projection unit 50 and the position on which the light is projected, or by processing image data to be projected. Alternatively, the intensity of the light to be projected may be set at an arbitrary value by the user.

Modification 5

While the light source unit 53 is a laser beam source for emitting laser beam in the above embodiments, not limited to this, the light source unit 53 may be constituted by discharge lamp such as halogen lamp, metal halide lamp, and high-pressure mercury lamp.

Modification 6

Figure 4B:
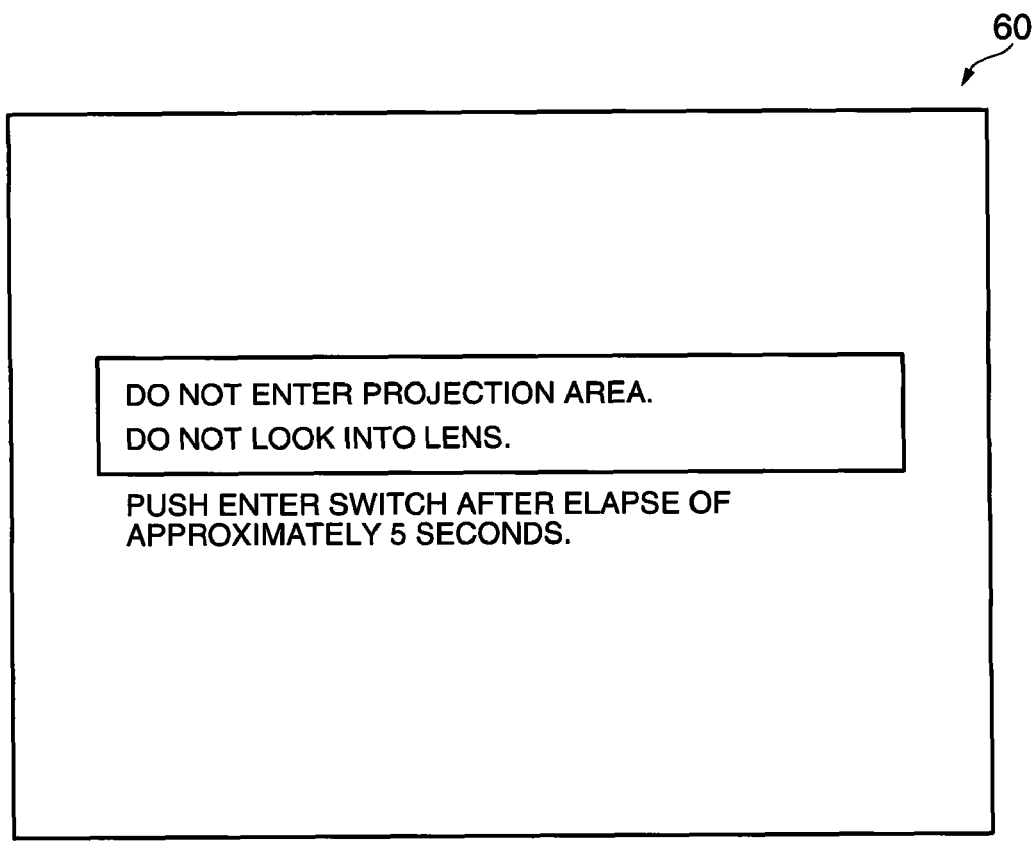

According to the above embodiments, the warning and operation message as shown in FIG. 4A are displayed on the screen of the touch panel 31p while the warning and operation message as shown in FIG. 4B are projected on the screen 60. Alternatively, message which induces user to see the screen 60 may be displayed on the screen of the touch panel 31p while the warning and operation message as shown FIG. 4B are projected on the screen 60. In this case, a user watching the screen of touch panel 31p can confirm screen 60 surely.

The entire disclosure of Japanese Patent Application Nos: 2007-133804, filed May 21, 2007 and 2008-105408, filed Apr. 15, 2008 are expressly incorporated by reference herein.

What is claimed is:
1. A projector, comprising:
an operation unit which receives operation by a user;
a projection unit which projects light corresponding to an image signal; and a light intensity control unit which controls light intensity of the light projected by the projection unit, wherein:

the light intensity control unit controls the light intensity in the order of reception of plural operations received by the operation unit from the user;

the light intensity control unit controls the light projected by the projection unit such that the light is a low-luminance light upon receiving a first operation from the user, the low-luminance light having a low light intensity;

the light intensity control unit controls the light projected by the projection unit such that the light is a high-luminance light upon receiving a second operation subsequent to the first operation from the user, the high-luminance light having a light intensity that is higher than the light intensity of the low-luminance light; and the operation unit receives the second operation only after elapse of at least a predetermined time from the reception of the first operation.

2. The projector according to claim 1, wherein the first operation and the second operation are operations for commanding the projection unit to project light.

3. The projector according to claim 1, wherein the predetermined time is approximately 5 seconds or longer.

4. The projector according to claim 1, further comprising:
a notifying unit which outputs notification information to be given to the user,
wherein
the notifying unit outputs notification information containing information for drawing attention to the light projected from the projection unit when the low-luminance light is projected from the projection unit.

5. The projector according to claim 4, wherein the notifying unit commands the projection unit to project the low-luminance light and containing the notification information.

6. The projector according to claim 4, further comprising:
a display unit which displays information for the user,
wherein the notifying unit commands the display unit to display the notification information.

7. The projector according to claim 1, wherein operation performed by the operation unit in the second operation differs for each reception of the second operation.

8. The projector according to claim 1, wherein at least the low light intensity of the light intensities of the low-luminance light and the high-luminance light is allowed to be set at an arbitrary value by the user.

9. The projector according to claim 1, wherein:
the projection unit has a light source which emits light; and
the light intensity control unit controls the light intensity of the light projected from the projection unit by adjusting the amount of the light emitted from the light source.

10. The projector according to claim 9, wherein the light emitted from the light source is laser beam.

11. The projector according to claim 10, wherein a process for examining the stability of the amount of the light emitted from the light source is performed after the low-luminance light is projected from the projection unit.

12. A control method of a projector, comprising:
an operation step which receives operation by a user;
a projection step which projects light corresponding to an image signal; and
a light intensity control step which controls light intensity of the light projected in the projection step, wherein:

the light intensity control step controls the light intensity in the order of reception of plural operations received from the user in the operation step;

the light intensity control step controls the light projected by the projection unit such that the light is a low-luminance light upon receiving a first operation from the user, the low-luminance light having a low light intensity;

the light intensity control step controls the light projected by the projection unit such that the light is a high-luminance light upon receiving a second operation subsequent to the first operation from the user, the high-luminance light having a light intensity that is higher than the light intensity of the low-luminance light; and the operation step receives the second operation only after elapse of at least a predetermined time from the reception of the first operation.

* * * * *